United States Patent [19]
Park et al.

[11] Patent Number: 5,483,501
[45] Date of Patent: Jan. 9, 1996

[54] SHORT DISTANCE ULTRASONIC DISTANCE METER

[75] Inventors: Kyung T. Park, Berwyn, Pa.; Minoru Toda, Lawrenceville, N.J.

[73] Assignee: The Whitaker Corporation, Wilmington, Del.

[21] Appl. No.: 236,907

[22] Filed: Apr. 29, 1994

Related U.S. Application Data

[63] Continuation-in-part of Ser. No. 121,392, Sep. 14, 1993.

[51] Int. Cl.$^6$ ............................................. H04R 17/00
[52] U.S. Cl. ...................... 367/140; 367/157; 310/317; 310/800; 340/904; 340/435
[58] Field of Search ......................... 367/140, 157, 367/908; 310/800, 317; 340/904, 435

[56] References Cited

U.S. PATENT DOCUMENTS

| | | | |
|---|---|---|---|
| 3,396,366 | 8/1968 | Midlock et al. | 340/38 |
| 4,015,232 | 3/1977 | Sindle | 340/1 T |
| 4,278,962 | 7/1981 | Lin | 340/34 |
| 4,636,997 | 1/1987 | Toyama et al. | 367/140 |
| 4,709,360 | 11/1987 | Martin et al. | 367/157 |
| 4,803,488 | 2/1989 | Dombrowski | 340/904 |
| 4,803,670 | 2/1989 | Chen | 367/99 |
| 4,864,298 | 8/1989 | Dombrowski | 340/904 |
| 4,910,512 | 3/1990 | Reidel | 340/943 |
| 4,967,180 | 10/1990 | Wang | 340/436 |
| 4,980,869 | 12/1990 | Forster et al. | 367/99 |
| 5,028,920 | 7/1991 | Dombrowski | 340/904 |
| 5,059,946 | 10/1991 | Hollowbush | 340/435 |
| 5,076,384 | 12/1991 | Wada et al. | 180/169 |
| 5,140,859 | 8/1992 | Shah | 73/597 |
| 5,160,927 | 11/1992 | Cherry et al. | 340/904 |
| 5,163,323 | 11/1992 | Davidson | 73/290 |

*Primary Examiner*—J. Woodrow Eldred
*Attorney, Agent, or Firm*—William Francos

[57] ABSTRACT

A short distance ultrasonic distance meter is disclosed with provisions to reduce the ill-effects of ringing when measurements are of obstacles closer than about ten inches. In one embodiment an opposite phase ultrasonic wave is introduced by a circuit (245) and in another embodiment a strain sensor (232) introduces negative feedback to effect cancellation of ringing (147). Finally, in a third embodiment, both the negative feedback and opposite phase methods are employed for optimal results.

10 Claims, 12 Drawing Sheets

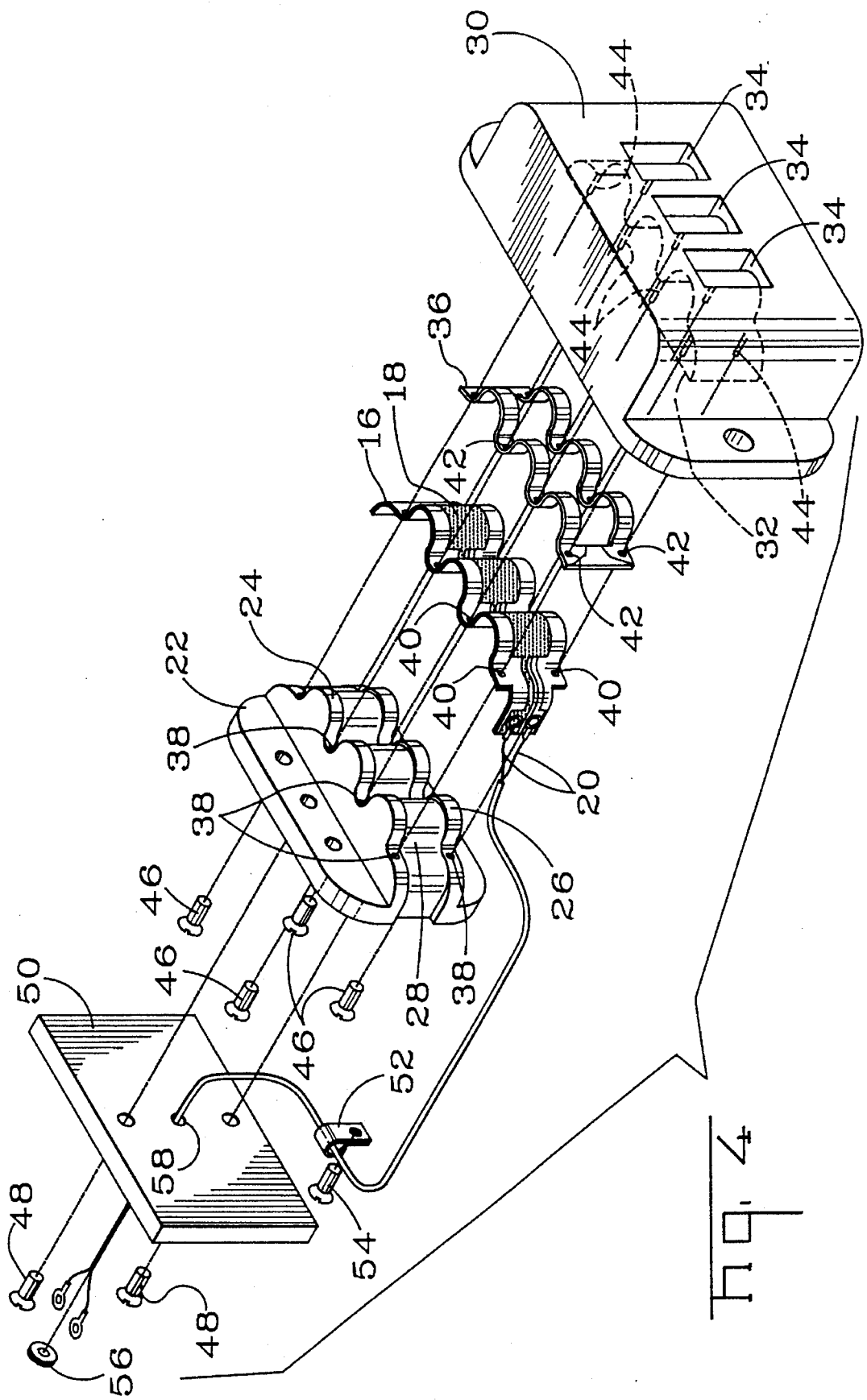

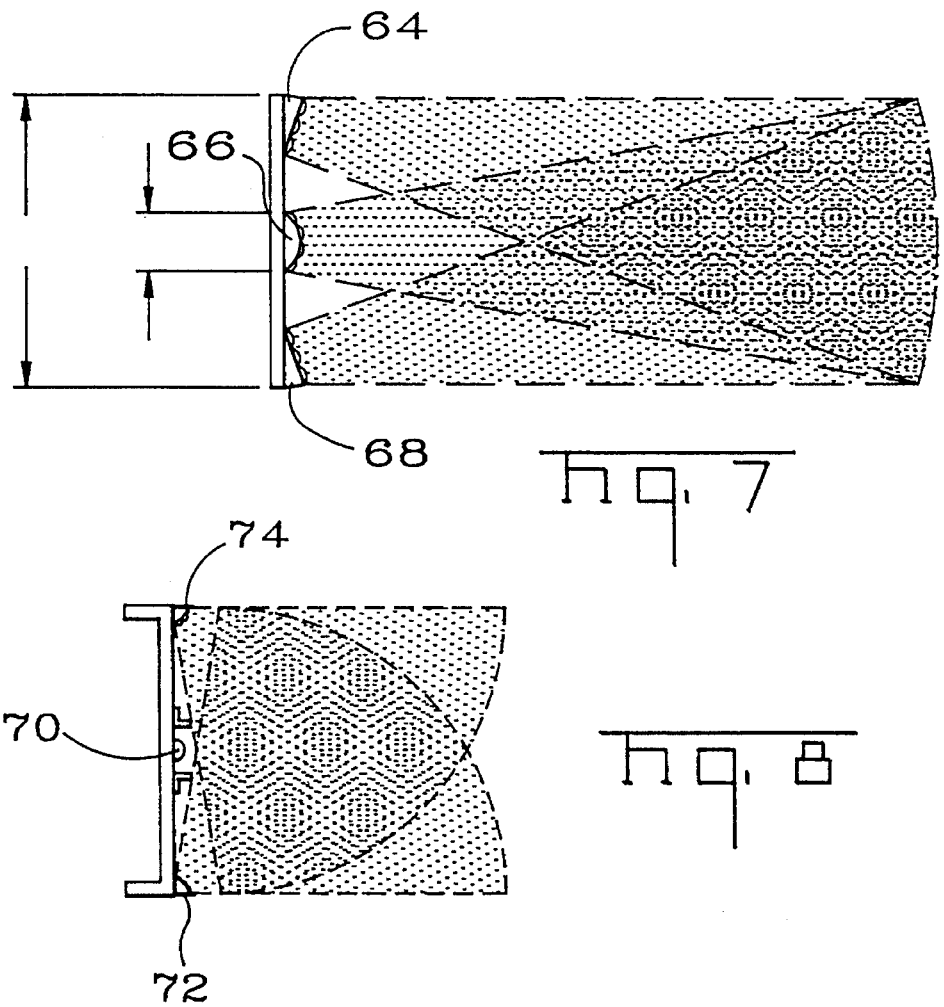
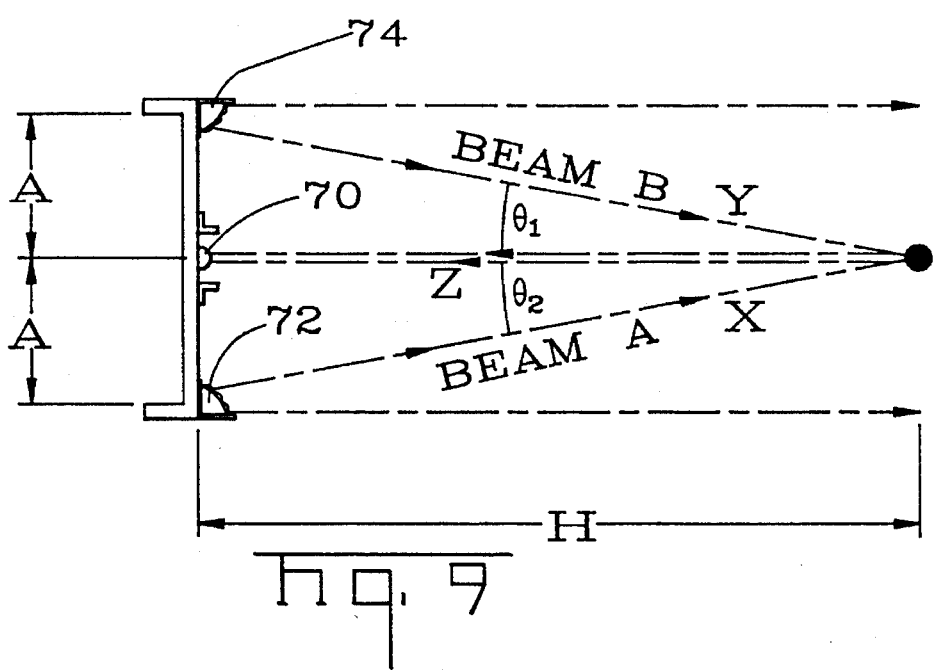

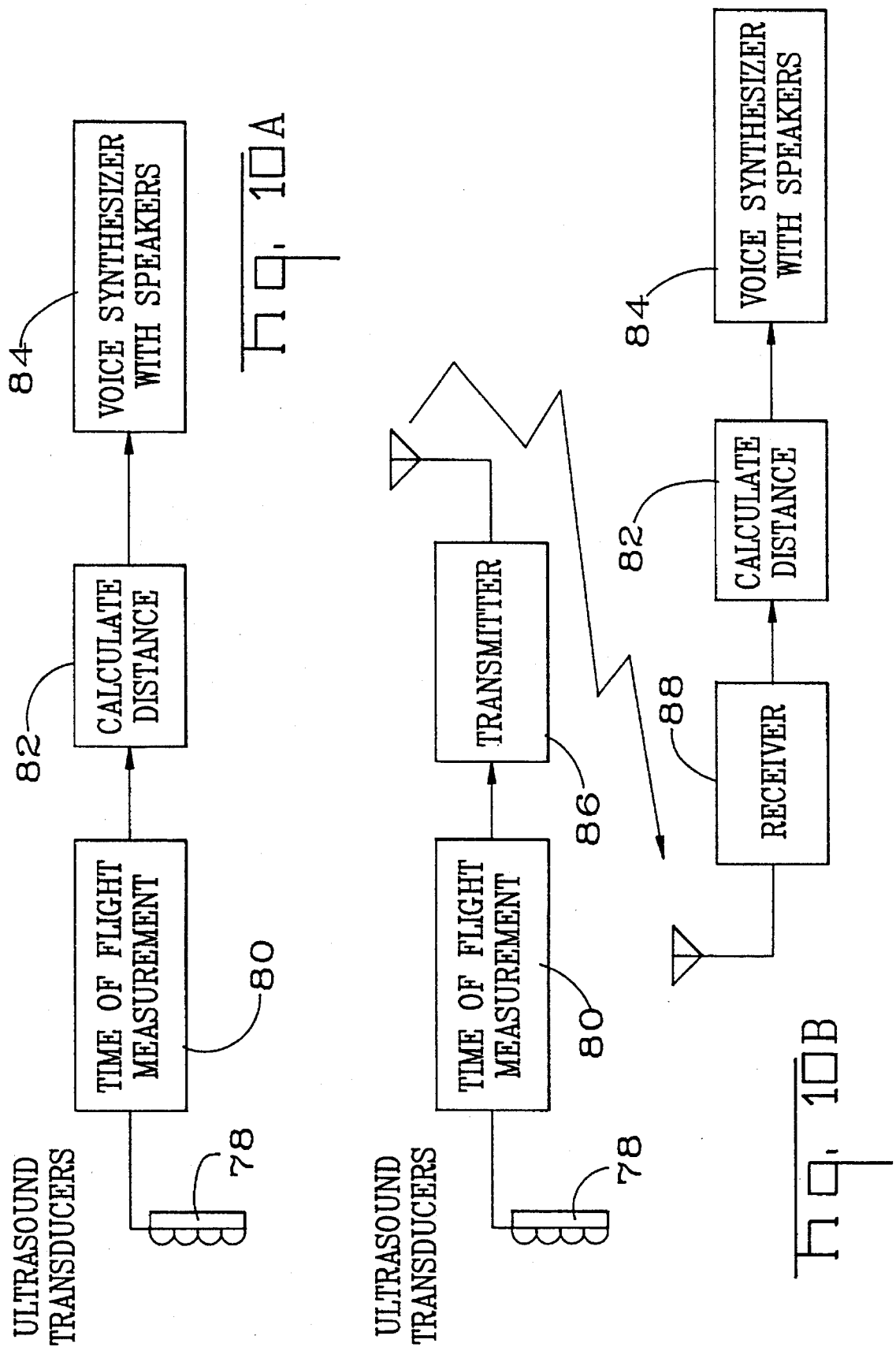

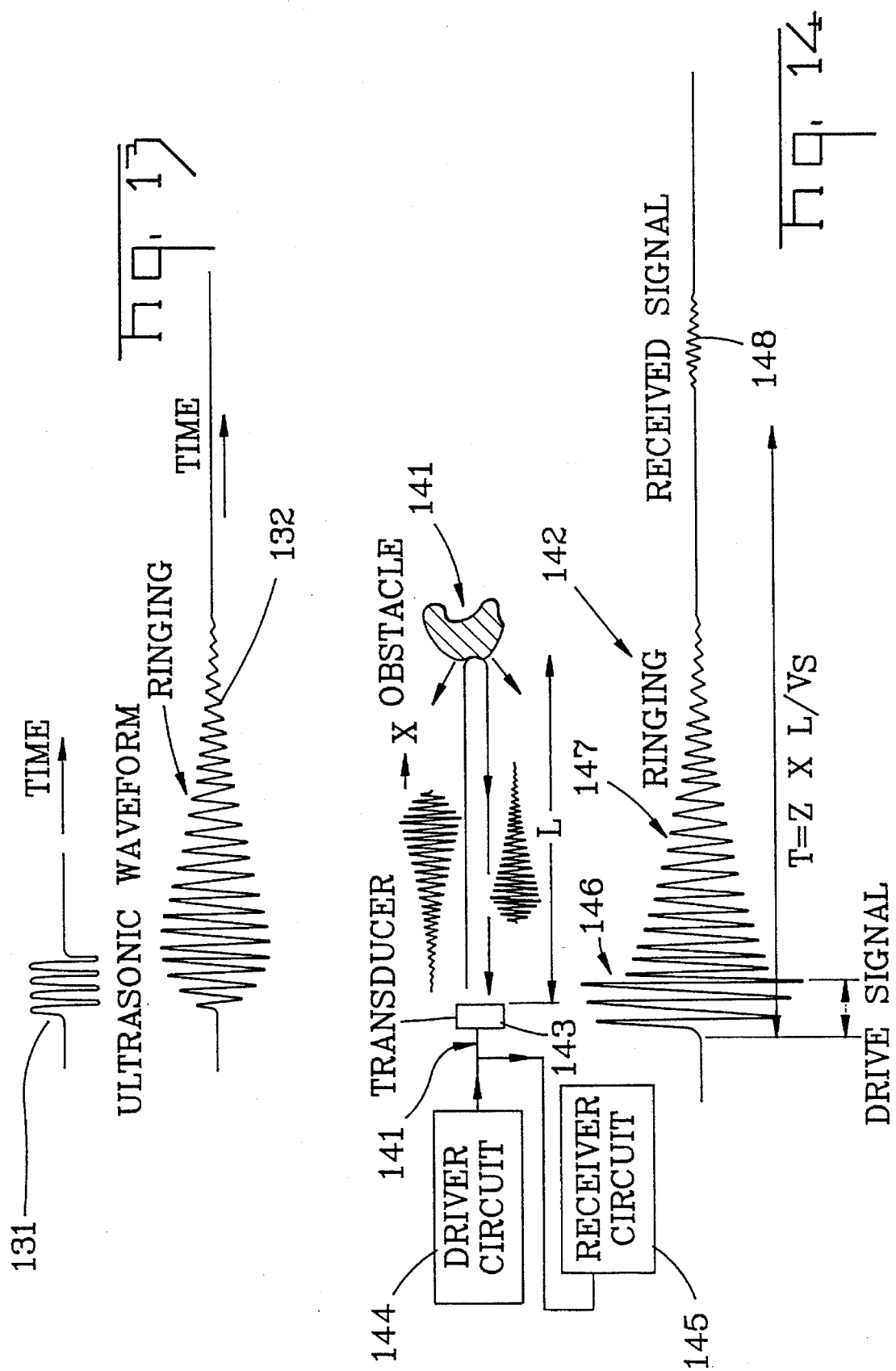

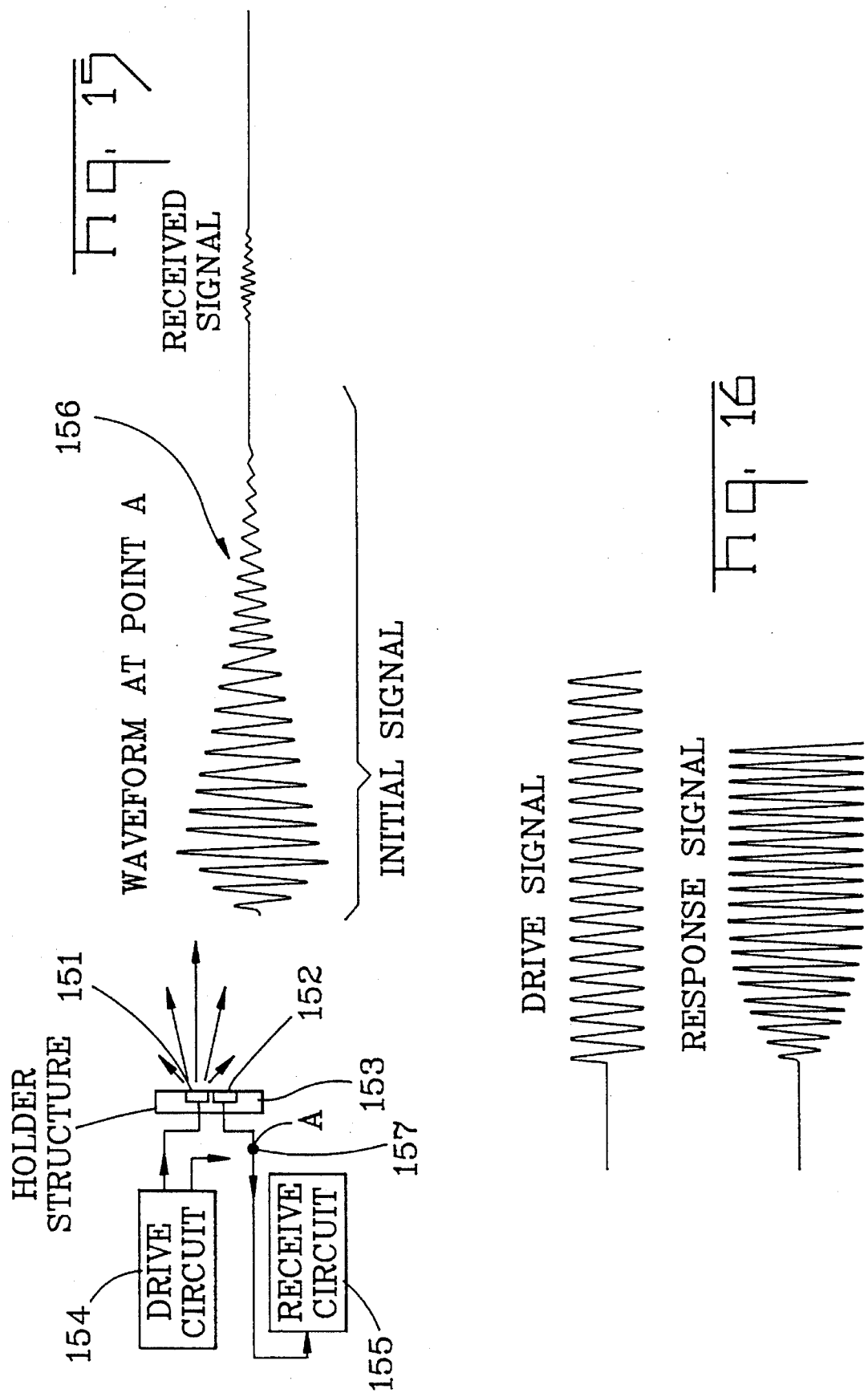

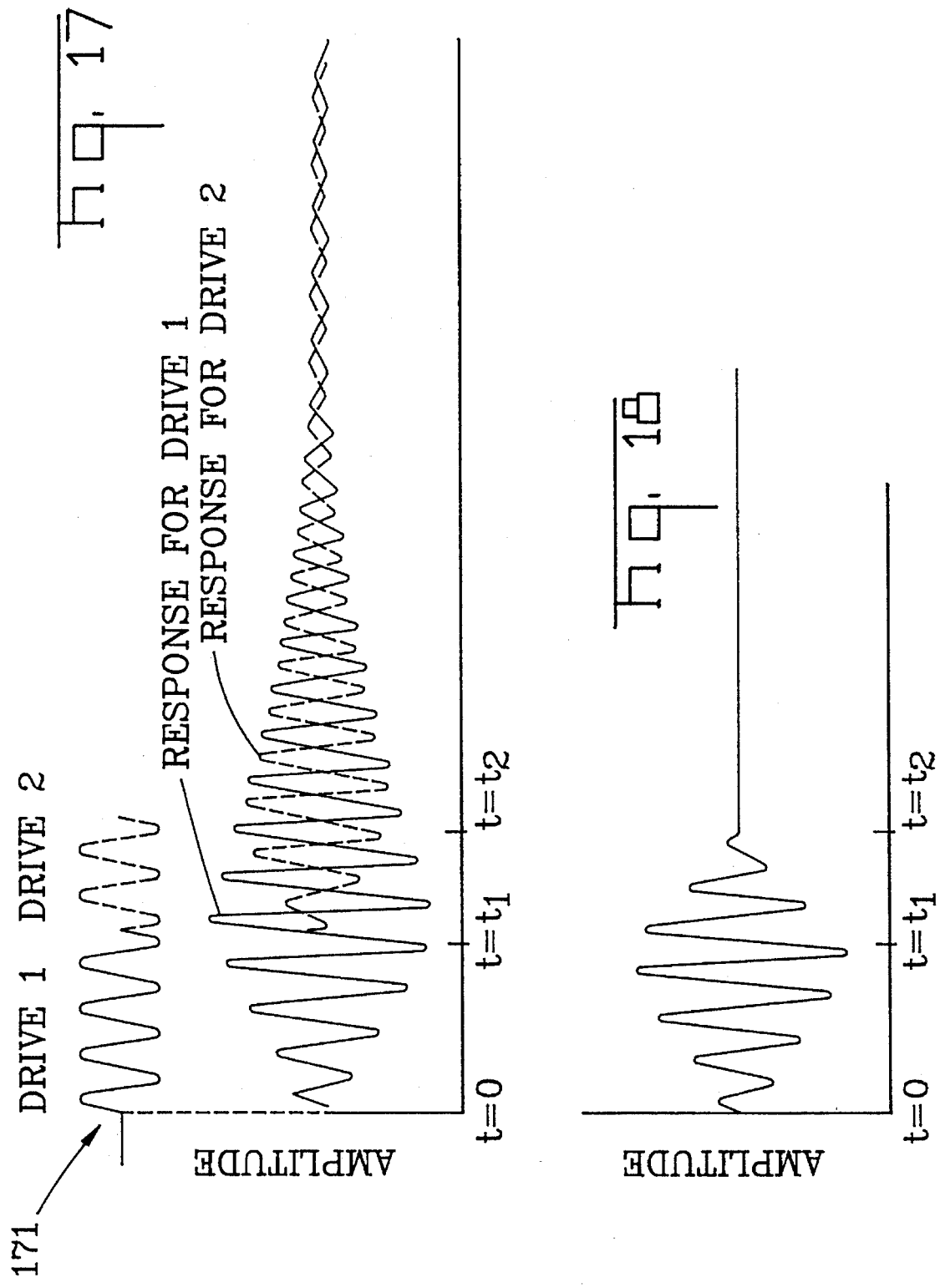

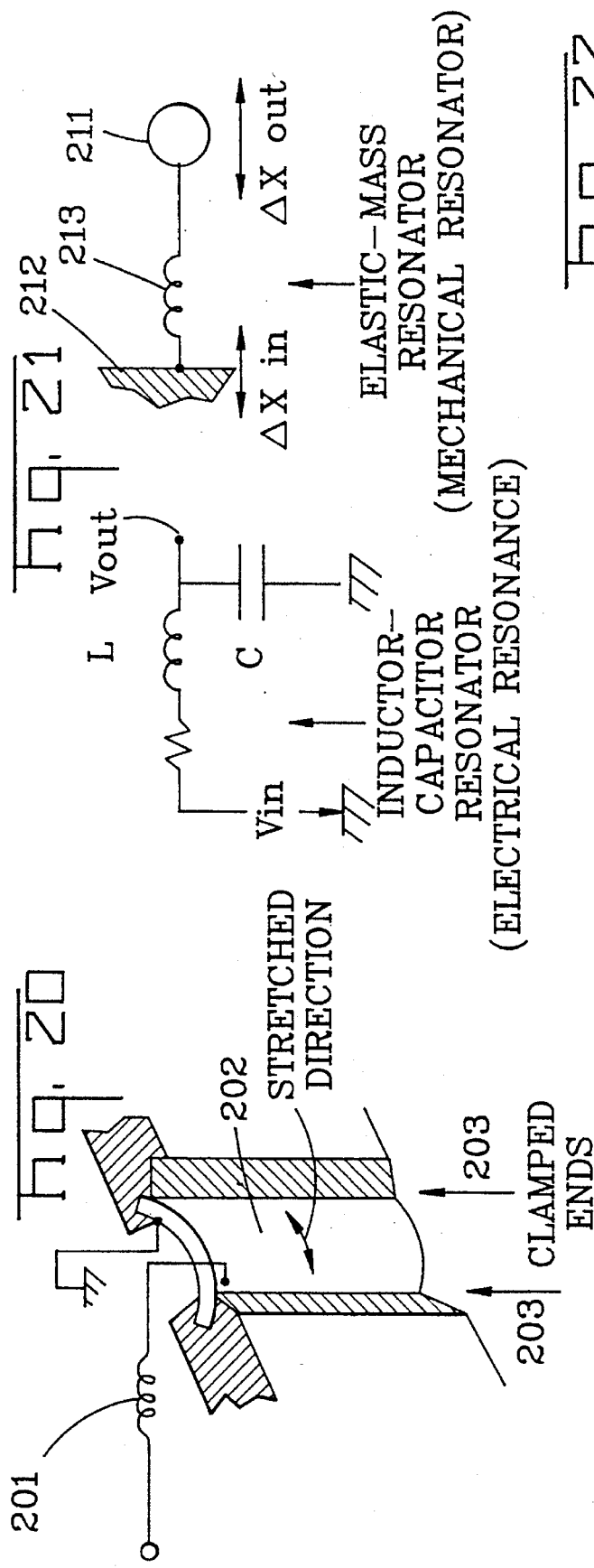
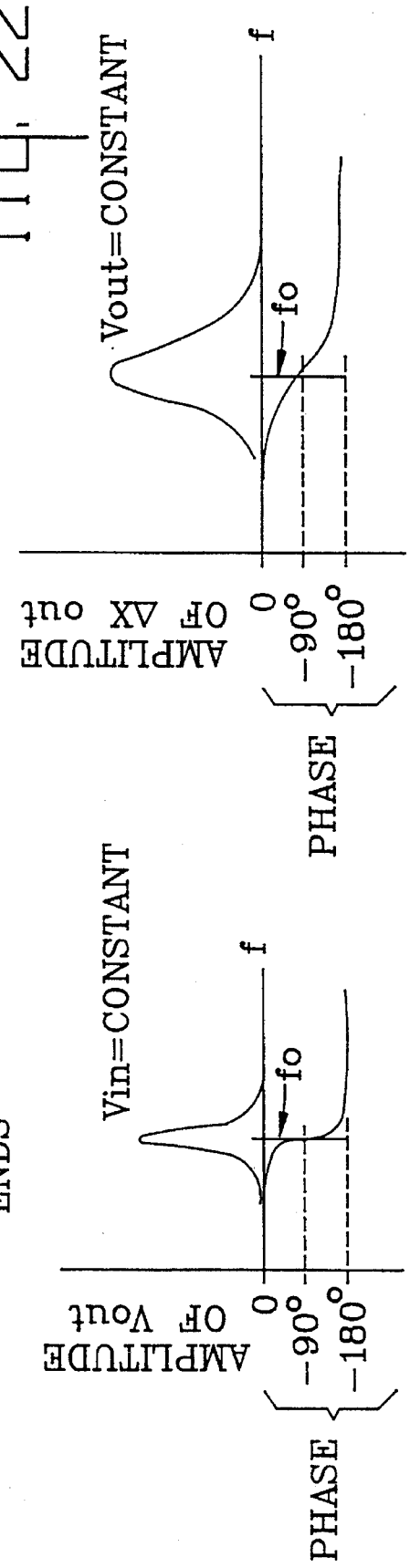

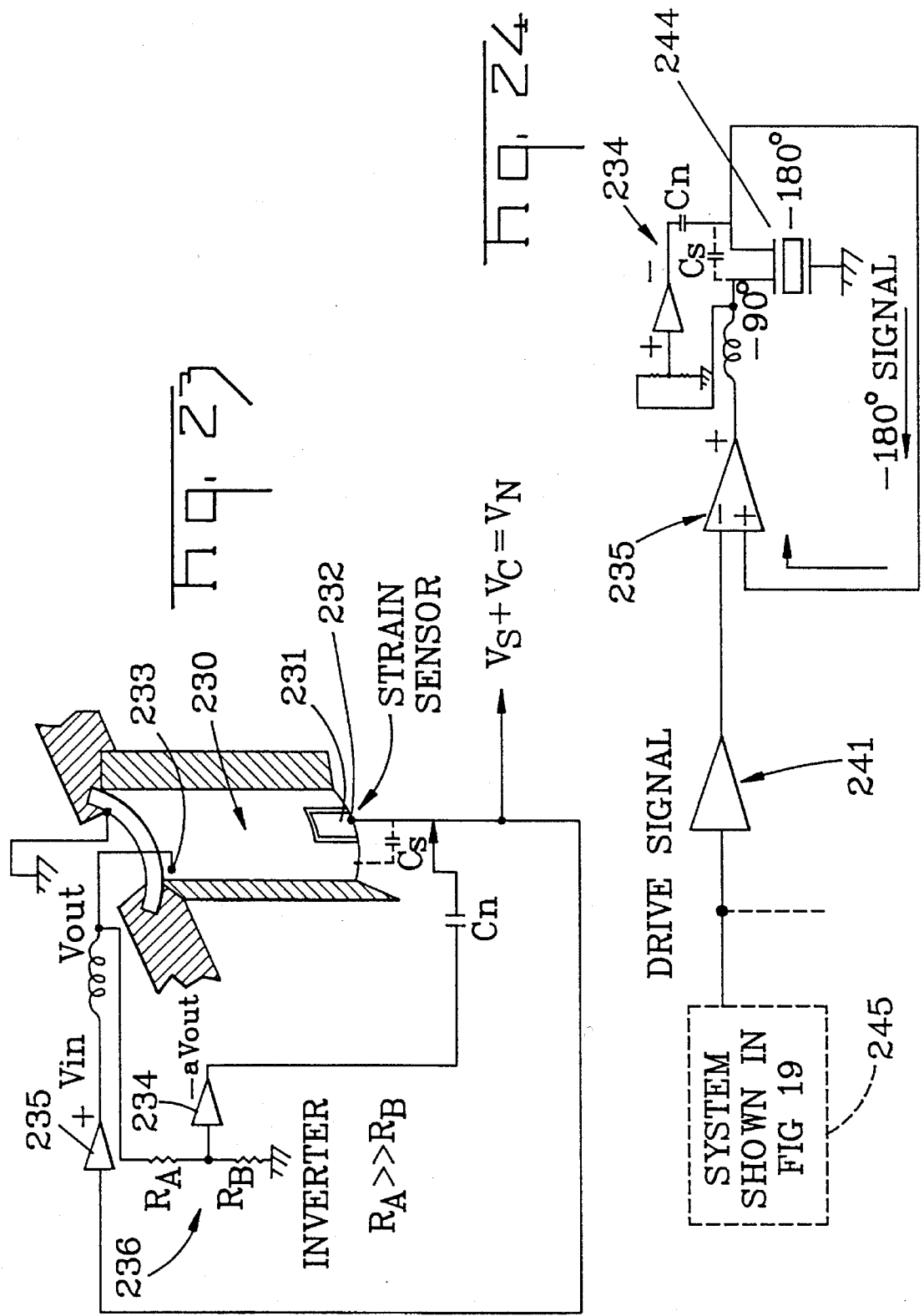

SHORT DISTANCE ULTRASONIC DISTANCE METER

BACKGROUND OF THE INVENTION

This is a Continuation-in-Part of application Ser. No. 08/121,392 filed Sep. 14, 1993 pending.

This invention relates to ultrasonic proximity sensors and, more particularly, to an improved ultrasonic proximity sensor utilizing polymer piezoelectric film in the transducer assembly.

Proximity sensors have many applications. For example, a proximity sensor mounted to a vehicle can provide a warning to the vehicle operator of the presence of an obstruction in the path of the vehicle. Thus, a proximity sensor mounted to the rear of a truck which is backing toward a loading dock can be utilized to alert the truck driver of the remaining distance to the loading dock. It is therefore an object of the present invention to provide a proximity sensor which may be utilized for such an application.

A proximity sensor utilizing radiated and reflected ultrasonic acoustic waves is a desirable form for use in such an application. The desired beam pattern for obstruction detection applications is a wide and thin beam, that is a beam which is less divergent in the vertical direction and more divergent in the horizontal directions. It is therefore another object of the present invention to provide a transducer assembly for generating an ultrasonic acoustic wave having such desired beam pattern.

An ultrasonic proximity sensor must be operable with great sensitivity in a range a short distance from the sensor. It is an object of the invention to provide a sensor that more efficiently operates in close proximity to a transducer or transducers.

SUMMARY OF THE INVENTION

The foregoing and additional objects are attained in accordance with the principles of this invention by providing a transducer assembly for a proximity sensor which comprises an elongated polymer piezoelectric film. The assembly also includes means for supporting the film as an elongated series of arcuate segments. All of the arcuate segments are curved in the same direction and have the same radius of curvature. In addition, there is provided means for applying a varying electric field across the thickness of the film within each of the arcuate segments to cause an ultrasonic acoustic wave to be radiated from the film.

In accordance with an aspect of this invention, the film supporting means includes a rigid backing member having a support surface shaped as an elongated series of arcuate segments all curved in the same direction and all having the same radius of curvature, and a rigid cover member adapted for placement so that the film is between the backing member and the cover member. The cover member has a cavity with an interior surface shaped complementarily to the backing member support surface. The film supporting means also includes means for securing the cover member to the backing member so that the film is tightly gripped between the backing member support surface and the cover member cavity interior surface.

In accordance with a further aspect of this invention, the cover member is formed with a series of spaced apertures in open communication with the cavity and each associated with a respective one of the arcuate segments of the film, and the transducer assembly further includes means for maintaining the film in spaced relation relative to the backing member in regions corresponding to the apertures of the cover member.

In accordance with another aspect of this invention, the backing member support surface is formed as a pair of spaced apart relatively narrow support surfaces and the space maintaining means comprises a surface region of the backing member between the pair of narrow support surfaces which is generally parallel to the pair of narrow support surfaces and spaced therefrom in a direction away from the cover member.

In accordance with yet another aspect of this invention, the electric field applying means includes a pattern of electrodes formed as conductive areas on both sides of the film, the conductive areas on each side of the film being spaced apart and each being associated with a corresponding conductive area on the other side of the film directly across the thickness of the film so as to form a series of spaced opposed pairs of electrodes.

In accordance with yet another aspect of the invention, a opposite phase ultrasonic wave is applied to reduce the ill-effects of ringing, thereby enabling efficient sensing in close proximity to the transducer.

In accordance with yet another object of the invention, negative feedback is applied in a two transducer sensor to reduce the ill-effects of ringing, thereby enabling efficient sensing in close proximity to the sensor.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 4 is an exploded perspective view of an illustrative practical transducer assembly according to this invention;

FIG. 7 shows a top view of a second embodiment of a proximity sensor according to this invention and utilizing three separate transducer assemblies, each of which functions as both a transmitter and a receiver;

FIG. 8 shows a top view of a third embodiment of a proximity sensor according to this invention and utilizing three transducer assemblies, two of which operate as transmitters and the third of which operates as a receiver;

FIG. 9 is a diagram useful for explaining how the distance between the sensor of FIG. 8 and an obstruction can be calculated;

FIGS. 10A and 10B are illustrative block diagrams of two embodiments of a distance determination and indicating arrangement according to this invention;

FIG. 13 shows the inpput electrical signal and the ultrasonic waveform with ringing.

FIG. 14 shows the single transmitting and receiving transducer system.

FIG. 15 shows the transducer system with separate transmitter and receiver.

FIG. 16 shows the drive signal and response of the transducer.

FIG. 17 shows the drive and response of the opposite phase method to reduce the ill-effects of ringing.

FIG. 18 shows the resultant waveform of the transducer with the effects of ringing negated.

FIG. 20 shows the piezoelectric transducer with ends clamped to form an electrical resonator and a mechanical resonator, FIG. 21 shows the equivalent electrical circuit and mechanical model of the resonators of FIG. 20.

FIG. 22 shows the dependance of the input and output voltages on the drive frequency.

FIG. 23 shows the negative feedback loop and the strain sensor used to reduce ringing.

FIG. 24 shows the combined negative feedback and opposite phase methods.

DETAILED DESCRIPTION

Figure 1:
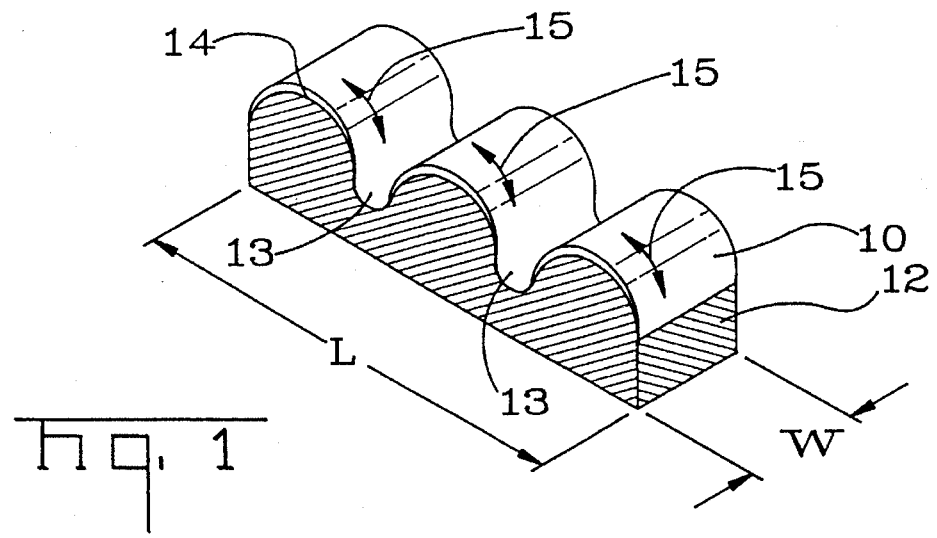
FIG. 1 is a perspective view schematically illustrating an ultrasonic acoustic wave generating transducer utilizing polymer piezoelectric film constructed in accordance with this invention for generating a straight ultrasound beam.

A polymer piezoelectric film is known to be a material that can be used to construct a wideband flexible ultrasound transducer. The desired beam pattern for detecting an obstruction is a wide and thin beam, that is a beam which is less divergent in the vertical direction and more divergent in the horizontal directions. By lengthening the ultrasound source along an axis the divergence of the generated beam in the plane of the axis becomes relatively small. FIG. 1 illustrates such a transducer according to this invention. As shown therein, the polymer piezoelectric film 10 is elongated and is supported as a series of arcuate segments. The arcuate segments all have the same predetermined radius of curvature and are all curved in the same direction. The film 10 is supported on an appropriately shaped support member 12 so as to maintain a space 14 between each of the arcuate segments of the film 10 and the support member 12. When a varying electric field of appropriate frequency is applied across the thickness of the piezoelectric film 10, the film 10 vibrates at that frequency to cause an ultrasonic acoustic wave to be radiated therefrom. The space 14 allows such vibration without interference by the support member 12.

Polymer piezoelectric material, specifically polyvinylidene fluoride (PVDF or $PVF_2$), is known to be formable into a flexible film even after stretching and poling. As is shown in FIG. 2, when this film 10 is held in a curved shape with two regions 13 clamped, the region between the clamped points vibrates in the direction normal to the plane (increasing or decreasing the radius) by application of AC voltage across the film thickness.

Figure 2:
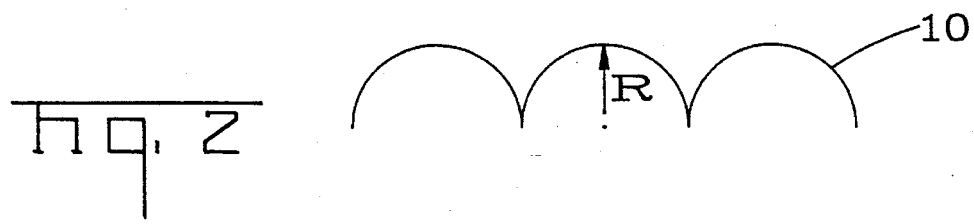
FIG. 2 is a side view showing the polymer piezoelectric film of FIG. 1 and is useful for explaining how the operating frequency of the transducer assembly is determined.

This vibration is caused by expansion or contraction of the length along the molecular chain direction (indicated by the arrows 15) which is chosen to be parallel to the tangential direction to the arc of the film 10. This principle was described in M. Tamura et al "Electroacoustical Transducers with Piezoelectric High Polymer" J. Audio Eng. Society 1975 Vol. 23. p. 21– 26. When the drive signal frequency is varied, the back-and-forth vibration shows a maximum at a resonant frequency $f_o$. This resonance is caused by the mass of the film and its elasticity. The resonant frequency is given by the following formula:

$$f_o = (1/2\pi R)(\sqrt{Y/P}\,)$$

where R equals the radius of the arcuate segment, Y equals Young's modulus and p is the density of the piezoelectric film 10, as is seen in FIG. 2. For example, if R equals 0.2 inches, then the operating frequency $f_o$ equals 45 Khz.

Figure 3A:
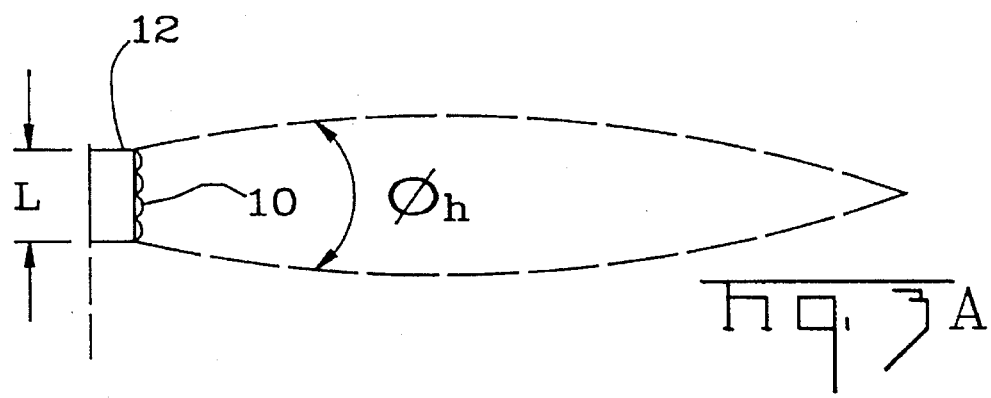
FIGS. 3A and 3B illustrate top and side views, respectively, of an inventive transducer assembly showing the horizontal and vertical, respectively, beam spread angles.
Figure 3B:
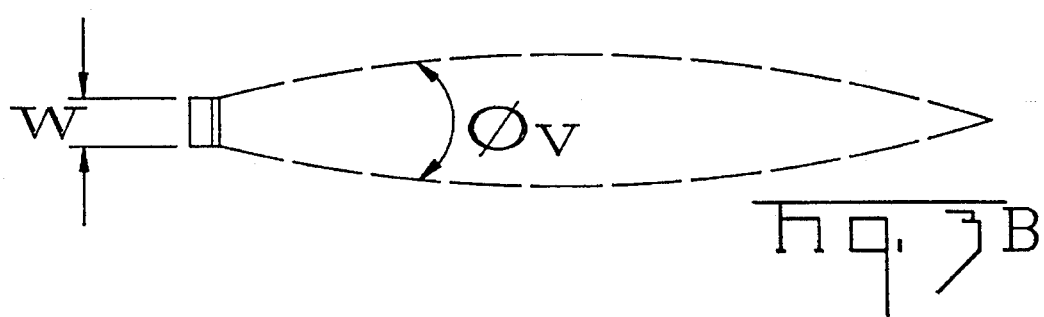

The beam angle of the radiated ultrasonic acoustic wave is determined by the size of the transducer, as shown in FIGS. 3A and 3B. For a transducer length L and width W, the horizontal beam angle $\phi_h$ is given by the following formula:

$$\phi_h = 2 \arcsin(1.895\, V_s/(\pi f_o L))$$

and the vertical beam angle $\phi_v$ is given by the following formula:

$$\phi_v = 2 \arcsin(1.895\, V_s/(\pi f_o W)),$$

where $V_s$ is the velocity of sound in air. As examples, $\phi_h = 0°$ for L=7 feet, $\phi_h = 2.5°$ for L=8 inches, and $\phi_v = 5°$ for W=4 inches.

FIG. 4 illustrates a practical construction for a transducer assembly of the type schematically shown in FIG. 1. As shown in FIG. 4, an elongated piezoelectric film 16 is provided with a pattern of electrodes 18 on its surface. The electrodes 18 are conductive areas, preferably silver ink, deposited on both sides of the film 16. The electrodes 18 on each side of the film 16 are spaced apart and generally rectangular in configuration and each has an associated conductive area on the other side of the film 16 directly across the thickness of the film so as to form a series of spaced opposed pairs of electrodes. All of the electrodes 18 on each side of the film 16 are interconnected by a pattern of silver ink and at one end of the film are connected to the wires 20. A varying electrical signal applied to the wires 20 at an appropriate frequency (e.g., 45 Khz) causes the piezoelectric film 16 to vibrate and produce an ultrasonic acoustic wave.

A backing member 22 is provided to support the film 16 as a series of arcuate segments. Thus, the backing member 22 includes a first support surface 24 and a second support surface 26. The support surfaces 24, 26 comprise a pair of spaced apart relatively narrow surfaces of the backing member 22, each of which is shaped as a series of arcuate segments all having the same predetermined radius of curvature and all being curved in the same direction. The radius of curvature of each of the segments is selected for the desired operating frequency of the transducer assembly, as previously discussed. In order to maintain appropriate spacing between the film 16 and the backing member 22 to allow the film 16 to vibrate, the backing member 22 is formed with a further surface region 28 between the pair of support surfaces 24, 26. The surface region 28 is generally parallel to the support surfaces 24, 26, but is displaced below the surfaces 24, 26.

In order to hold the film 16 against the backing member 22 and preserve the desired arcuate shape of the film 16, there is provided a cover member 30. The cover member 30 has a cavity 32 with an interior surface which is shaped complementarily to the support surfaces 24, 26. The interior surface of the cavity 32 is continuous between the portions which are complementary to the support surfaces 24, 26, so that when the cover member 30 is mounted to the backing member 22, there is a space between the interior surface of the cavity 32 and the displaced surface region 28 of the backing member 22.

The cover member 30 is formed with a series of spaced apertures 34 in open communication with the interior cavity 32. Each of the apertures 34 is associated with a respective one of the arcuate segments of the backing member 22, and hence the arcuate segments of the film 16, so that the acoustic waves produced when the film 16 is caused to vibrate can escape from the cover member 30.

The assembly shown in FIG. 4 also includes a flexible gasket 36 between the film 16 and the cover member 30, which functions to seal and protect the remainder of the assembly from the elements.

To properly align the backing member 22, the film 16, the gasket 36, and the cover member 30, each of the backing member 22, the film 16, and the gasket 36 is formed with a plurality of appropriately positioned and registrable holes 38, 40 and 42, respectively, and the cover member 30 is molded with a plurality of corresponding pins 44 within the interior cavity 32. During assembly, the pins 44 extend through the aligned holes 38, 40 and 42. A plurality of screws 46 secure the backing member 22 to the cover member 30, with the film 16 and the gasket 36 therebetween, and the screws 48 secure a back plate 50 to the backing member 22 and the cover member 30 as part of the final assembly. Strain relief for the wires 20 is provided by the strain relief element 52 which is secured to the backing member 22 by the screw 54, and a gasket 56 is provided to seal the opening 58 in the back plate 50 through which the wires 20 extend.

Figure 5:
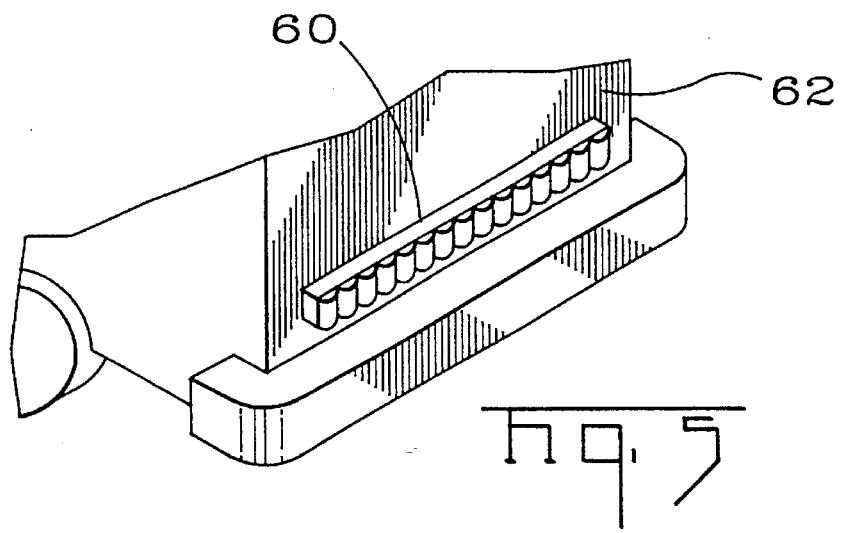
FIG. 5 shows an illustrative mounting arrangement for the assembly of FIG. 4.

FIG. 5 illustrates the mounting of an elongated transducer assembly 60 to the rear of a vehicle, illustratively a truck 62. As shown, the assembly 60 is an elongated version of the assembly depicted in FIG. 4.

Figure 6A:
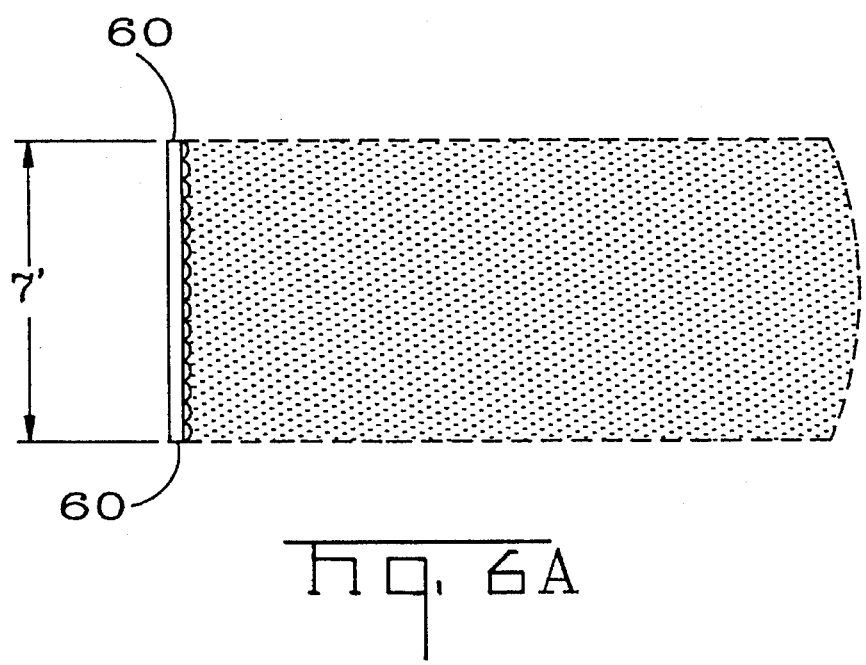
FIGS. 6A and 6B illustrate top and side views, respectively, of a first embodiment of a proximity sensor utilizing a single transducer assembly for both transmission and reception.
Figure 6B:
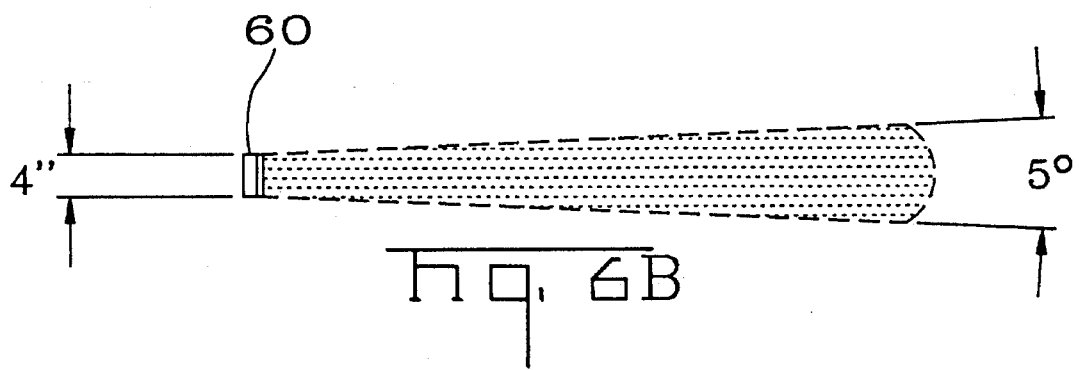

FIGS. 6A and 6B illustrate top and side views of the transducer assembly 60 (FIG. 5) showing the beam pattern thereof. With the length of the transducer assembly 60 being approximately seven feet, the top view of FIG. 6A shows the beam pattern to be straight and the side view of FIG. 6B shows, for a height of four inches for the assembly 60, that the vertical beam spread is 5°. To maximize system efficiency, all of the arcuate segments of the piezoelectric film making up the assembly 60 are active during the transmission mode and only one or two of the arcuate segments are active during the receive mode.

FIG. 7 is a top view of an embodiment of a proximity sensor which utilizes three separate transducer assemblies 64, 66 and 68, each of which is constructed as shown in FIG. 4, with the exception that the central transducer assembly 66 is curved, rather than straight. Thus, as shown in FIG. 7, the assemblies 64, 66 and 68 are mounted with their major axes lying substantially in a single horizontal plane. The flanking transducer assemblies 64 and 68 are equally spaced from the central transducer assembly 66 and are oppositely angled each toward the central transducer assembly 66. Since the assemblies 64, 66 and 68 are relatively short, they have a noticeable beam spread. However, as shown in FIG. 7, by utilizing the appropriate mounting angles for the flanking assemblies 64 and 68, the overall beam, made up of overlapping beams, can be considered to be relatively straight. Additionally, it will be noted that there are two blind zones between pairs of the transducer assemblies 64, 66 and 68, but these blind zones can be minimized by properly arranging the mounting angles for the flanking assemblies 64 and 68. Each of the transducer assemblies 64, 66 and 68 is operated as both a transmitter and receiver.

FIG. 8 is a top view of a further embodiment wherein a single arcuate segment transducer assembly 70 is utilized as a receiver and a pair of transmitter transducer assemblies 72 and 74, each of which produces a substantially 90° beam pattern, are equally spaced on either side of the transducer assembly 70. With the arrangement shown in FIG. 8, the detection range is limited, being substantially the same as the spacing between the transducer assemblies 72 and 74, but measurement accuracy is very high.

FIG. 9 illustrates how the distance between an obstruction 76 and the proximity sensor of FIG. 8 can be calculated from the measured time of flight from the transmitters 72, 74 to the receiver 70. Thus, when an acoustic wave is transmitted from the assembly 72, reflected from the obstruction 76, and received by the receiver 60, its measured time of flight $k_1$ is:

$$k_1 = (X+Z)/V_s$$

and the time of flight $k_2$ from the transmitter 74 is:

$$k_2 = (Y+Z)/V_s;$$

where $V_s$ is the velocity of sound in air. X, Y and Z are solved from the following equations:

$$A^2 = X^2 + Z^2 - 2XZ \cos \theta_1$$

$$A^2 = Y^2 + Z^2 - 2YZ \cos \theta_2$$

$$(2A)^2 = X^2 + Y^2 - 2XY \cos (\theta_1 + \theta_2),$$

where A is the known spacing between each of the transmitters 72, 74 and the receiver 70. The distance H can then be calculated from X, Y and Z using known trigonometric and geometric relations.

FIG. 10A illustrates an application of the present invention wherein a transducer assembly 78, of the type described, is connected to circuitry 80 which measures the time between transmission and reception of an ultrasonic pulse. This measurement is provided to distance calculator 82 which determines the distance to the obstruction and provides this information to the voice synthesizer 84, which provides an audible indication to the driver. Alternatively, as shown in FIG. 10B, the measurement circuit 80 and the calculator circuit 82 can be connected via a wireless transmission scheme comprising the transmitter 86 and the receiver 88 if it is more convenient to use this method than running wires between the front and rear of a vehicle.

Figure 11A:
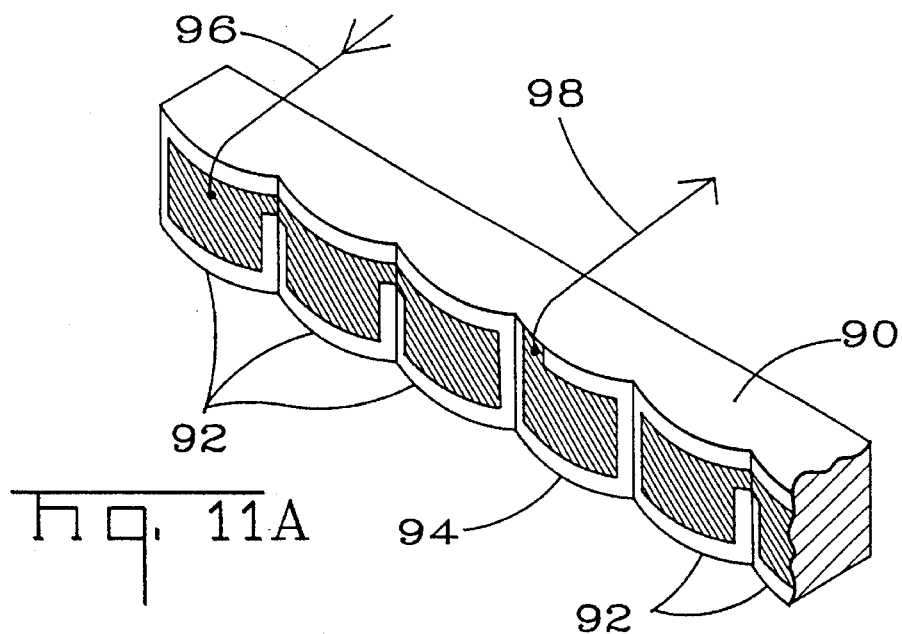
FIGS. 11A and 11B are a schematic view of a transducer assembly and illustrative waveforms, respectively, useful for illustrating the self diagnostic capability of the sensor according to this invention.
Figure 11B:
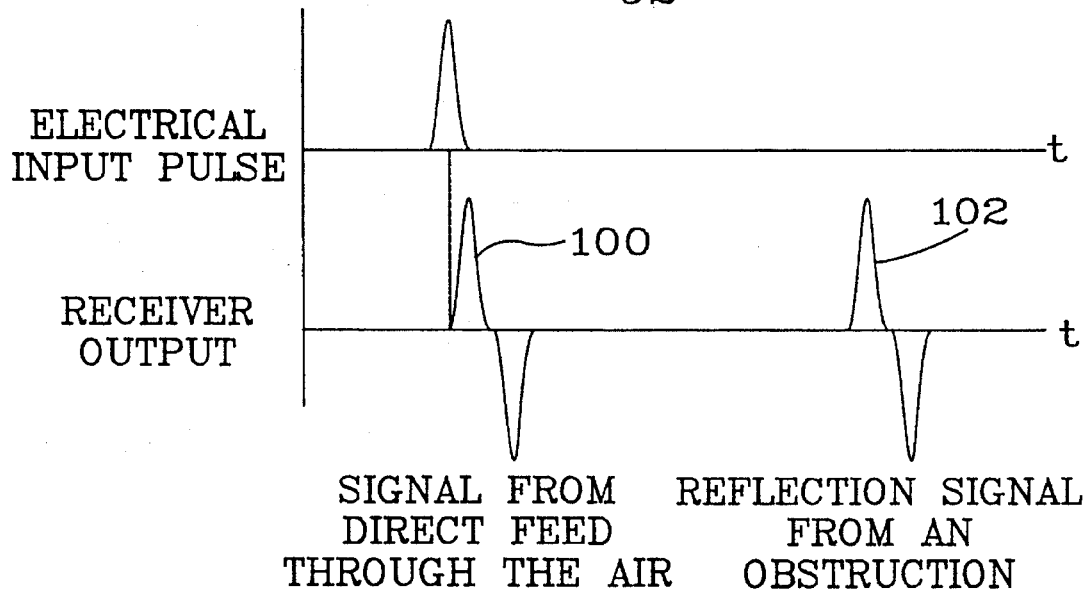

An advantage of utilizing the piezoelectric film in a transducer assembly of the type described is that a self diagnostic function can be designed. Thus, as shown in FIG. 11A, the transducer assembly 90 is made up of transmitting elements 92 and receiving elements 94. When a pulse is applied to the transmitting elements 92 over the lead 96, the generated acoustic wave is directly fed to the receiving element 94 through the air. FIG. 11B illustrates the input electric pulse and the output of the receiver element 94 over the lead 98 which includes a pulse 100 in response to the direct feed through the air followed by a pulse 102 in response to a reflected signal from an obstruction. The first pulse 100 is used for diagnostic purposes to indicate that the system is operative, but is ignored for measuring distance, when only the second pulse 102 is considered.

Figure 12:
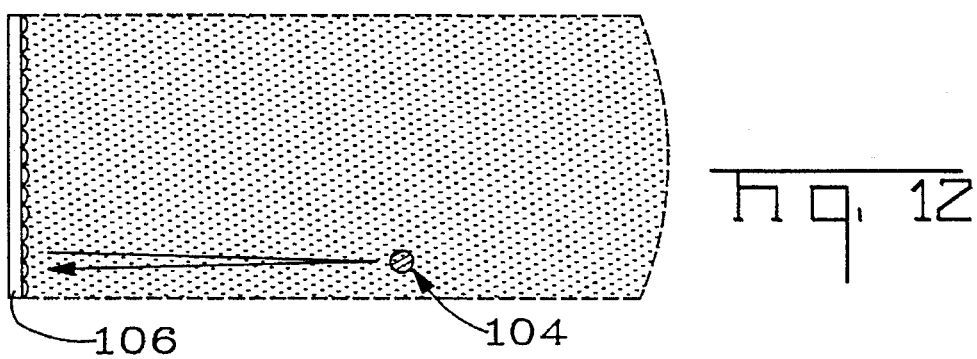
FIG. 12 shows how the two dimensional position of an obstruction can be determined in accordance with this invention.

FIG. 12 illustrates how the two dimensional position coordinates of an obstruction 104 can be determined. Thus, as shown in FIG. 12, the transducer assembly 106 is made up of a plurality of individual transmitter elements. Each of the elements is activated in sequence and by calculating the time of flight of the acoustic pulse to each of the receiver elements, the position coordinates of the obstruction 104 can be determined in two dimensions.

One problem of back-up sensors and the like, is their inability to detect an obstacle at a short distance due to long lasting ringing of the resonated transducer after pulse excitation. This ringing can be of a mechanical or an electrical wave. As is shown in FIG. 13, when a pulse modulated high frequency signal 131 drives a resonant transducer, the excited ultrasonic wave experiences ringing after the driving of the transducer as is seen at 132. Generally, there are two kinds of sensors systems which require two different remedies to reduce the ill-effects of ringing in short distance proximity sensors.

The first type of short distance proximity sensor comprises one transducer which functions as a transmitter and a receiver. This type of system is shown in FIG. 14, without compensation for ringing. The transducer 143 is connected to a drive circuit 144 and a receive circuit 145. When a drive signal 146 excites the transducer 143, an ultrasonic wave emanates from the transducer and is reflected from the obstacle 149 and is then impingent on the transducer 143 and a signal is received in the receiver circuit 145. The resulting waveform 142 of the electrical signal at 141 consists of the drive signal 146, the ringing 147 and the received signal 148. As is shown, the period between the drive signal and the received signal is given simply by $T=2(L/V_s)$; where L is the distance between the transducer and the obstacle and $V_s$ is the sound velocity in the medium of travel. As can be appreciated from referring to the waveform, as the distance L decreases, the received signal and ringing overlap, and the received signal can not be reliably detected at short distances. For example, the sensing system as shown has been found to experience difficulty at distances smaller than about ten inches. FIG. 15 shows a typical two-transducer system, in which a first transducer 151 acts as a transmitter and is controlled by a drive circuit 154 and a second transducer 152 acts as a receiver with its output going to a receiver circuit 155. The received waveform 156 at 157 is shown. Initially the waveform has a strong electrical signal. This strong signal is a result of the relatively wide angle of the radiated wave, which is necessary for effective sensing. The wave emanates from the transmitting transducer 151 and is received by the receiving transducer 152 directly. This type of transducer arrangement experiences similar problems due to ringing as are experienced in the single receiver/transmitter transducer. As is evident from the waveform 156, when the ringing problem exists and in a short distance sensing application, the received signal can not be reliably detected. Furthermore, vibration from the transmitting transducer 151 propagates through the holder 153 and is picked up by the receiving transducer 152. Finally, as will be discussed in detail below, in many applications the drive and receive circuits are capacitively coupled, for example when both circuits are in the same housing or on the same circuit board. This results in self-vibration of the transducer, which results in false signals.

Figure 19:
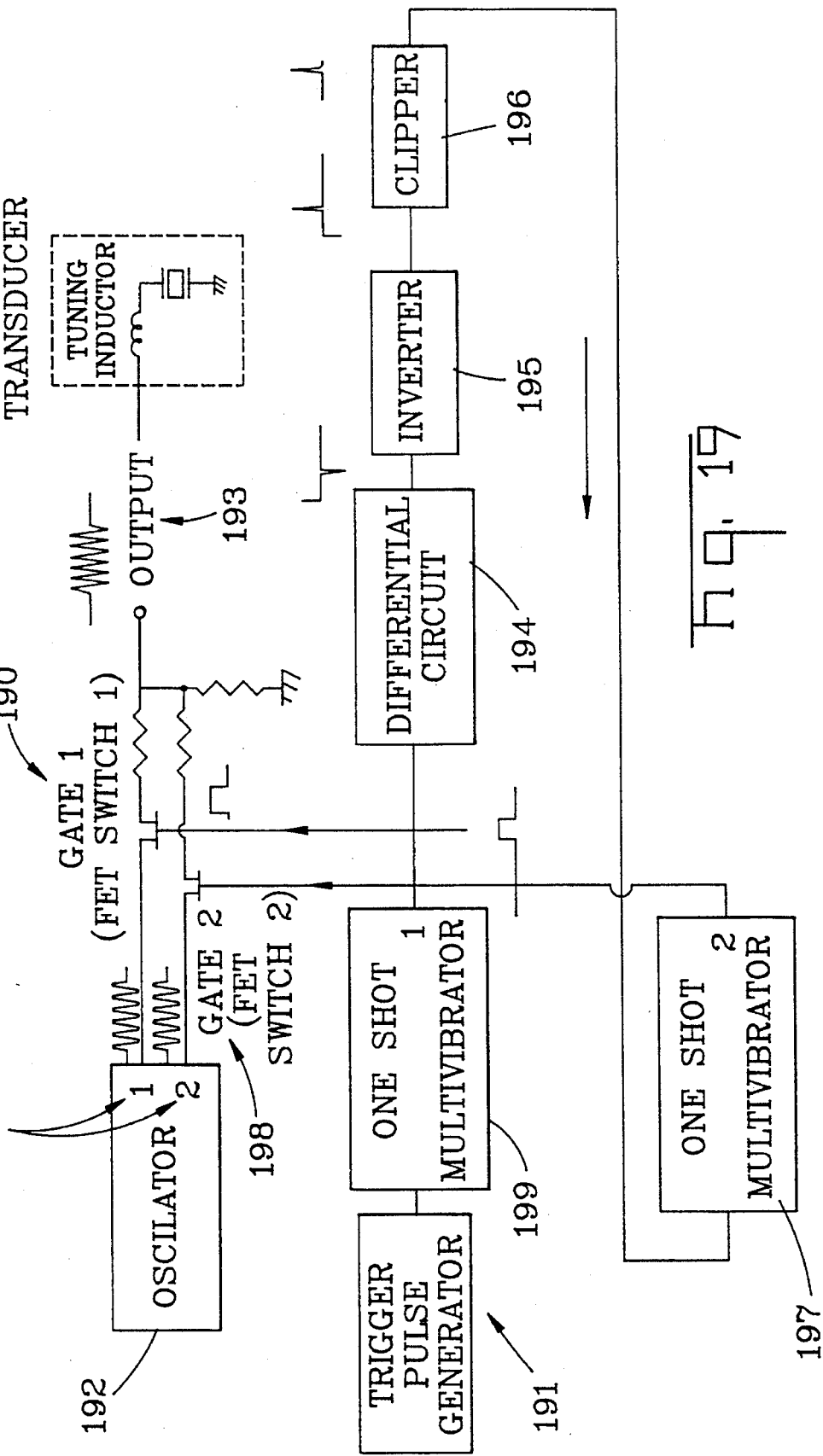
FIG. 19 shows the oscillator circuit employed in the opposite phase method.

One method employed to curb the ill-effects of ringing is the opposite phase drive method. Turning to FIG. 16, the drive signal 161 is switched on at t=0 and switched off at $t=t_1$. This results in the ringing previously described. As is shown in FIG. 17, the ringing after $t=t_1$ is shown by the solid line in the pictured waveform. By introducing an equal amplitude drive signal of opposite phase from a second drive source at $t=t_1$ lasting in duration until $t=t_2$, the destructive interference of the waves reduces the ill-effects of ringing. This wave resulting from the second drive is shown in FIG. 17 as a dotted line, and the resulting waveform is shown in FIG. 18. As can be appreciated from FIG. 17, the response signal of drive 1 for $t>t_1$ decreases in amplitude with time due to damping. Clearly, to effect the destructive interference needed to reduce ringing, this decrease in the amplitude of the response signal from drive 1 will require a drive signal from drive 2 which is either shorter in duration or smaller in amplitude than that of drive 1. In the first instance the amplitude of drive 1 and drive 2 are equal, so the period $t_2-t_2$ must be slightly less than $T_1$, which is the period of the first drive signal. If the period of the drive signals are equal, the amplitude of the second drive signal is less than the first drive signal. An example of a circuit to generate two signals of short duration with opposite phase is shown in FIG. 19. The trigger pulse generator 191 triggers a one-shot multivibrator 199 which generates a pulse with a finite period which opens gate 1 and output 1 of the oscillator 192. This signal goes directly to final output 193. The output pulse from the one-shot multivibrator is differentiated in the differential circuit 194, and positive and negative sharp pulses are generated at the inverter 195 and clipper 196. This signal is then used to trigger the second one shot multivibrator 197, which in turn opens gate 2, a FET switch 198. A similar FET switch 190 serves to open gate 1. The signal from output 2 of the oscillator is then fed to the final output 193 in opposite phase to that of output 1 of the oscillator. This ringing cancellation method works not only for a piezoelectric transducer, but also for drive circuits for other types of resonators.

Another method used to curb the ill-effects of ringing in piezoelectric sensors is by the use of a strain sensing section in the transducer, which is used to introduce negative feedback to the input of the transducer, thereby eliminating self-vibration in the transducer. This self-vibration is due primarily to the fact that by its very nature, a piezoelectric material will act as an mechanical resonator, as will be discussed in further detail below. This self-resonance creates false readings and a method has been devised to suppress the self-vibration, and thereby reduce the ill-effects of ringing. In this method, the vibration of the PVDF ultrasonic transducer is sensed by a section of the film of the transducer which is electrically isolated from the main section of the transducer film 230. A signal is fed from the sensing section 231 to the input stage of an amplifier shown as 235 in FIG. 23. The polarity of the feedback signal is chosen so as to suppress self-vibration of the transducer. This general type of feedback loop is known. However, this invention describes a method of solving problems specific to feedback correction in PVDF ultrasonic transducers.

Turning to FIG. 20, when an inductance 201 is connected in series with a PVDF curved resonator, two resonators are effectively combined. One is an L-C resonator in which the intrinsic capacitance of the PVDF transducer makes up the capacitor of the circuit. Hereinafter this is referred to as the "electric resonance." Another resonator is made up of the curved plate 202, with ends clamped at 203. The mass of the PVDF is held by an elastic thin sheet of PVDF itself and with length expansion and contraction (along the stretched direction as is shown) it resonates at a particular frequency, in response to an applied voltage. Hereinafter, this is referred to as "mechanical resonance." FIG. 21 shows the equivalent circuit of the coupled resonators made up of the electrical resonance and the mechanical resonance. As is known, $V_{in}$ and $V_{out}$ have a frequency relation to one another that is frequency dependent. This relation is shown graphically in FIG. 22. The amplitude becomes a maximum at resonance frequency, $f_o$. At this resonance frequency, $V_{in}$ leads $V_{out}$ by 90 degrees. $V_{out}$ is then applied to the PVDF thereby generating a mechanical vibration, manifesting in the expansion and contraction of the length of the PVDF film in the stretched direction as is shown in FIG. 20. But this expansion and contraction of the PVDF has the same effect as the vibration of the clamped end as is shown in FIG. 21 as $\Delta X_{in}$ in the equivalent mechanical model of a mass 211 fastened to a rigid wall 212 by a spring 213. Finally, it is important to note that $V_{out}$ and $\Delta X_{in}$ are in phase. Clearly, when $V_{in}$ is known and $\Delta X_{out}$ is measured, the phase of $\Delta X_{out}$ lags that of $V_{in}$ by 180 degrees at resonance. This is due to the fact that at resonance $V_{in}$ leads $V_{out}$ by 90 degrees, $V_{out}$ and $\Delta X_{in}$ are in phase and $\Delta X_{in}$ leads $\Delta X_{out}$ by 90 degrees.

As is shown in FIG. 23, in order to detect the vibration of the PVDF transducer 230, one section 231 is provided with a strain sensing function. The electrode 232 of this section is physically separated from the drive electrode 233. The strain sensor 231 is electrically isolated from the main section of the transducer 230. The strain sensing section 231 is depicted as being substantially square, however other configurations are certainly within the purview of the skilled artisan. When the transducer is at resonance and the amplitude of the vibration is at a maximum, the strain induces a voltage $V_s$ in the piezoelectric material in the strain sensing section 231. Because the output voltage of the strain sensing section $V_s$ follows $\Delta X_{out}$, this voltage is 180 degrees out of phase with the input voltage $V_{in}$. This phase relationship between $V_{in}$ and $V_s$ is independent of the polarization of the PVDF. By taking advantage of this opposite phase relationship between $V_s$ and $V_{in}$, the ill-effects of ringing are substantially eliminated. This is achieved by the feedback loop shown in FIGS. 23 and 24, with the stray capacitance and the voltage associated therewith, $V_c$, essentially eliminated as is discussed presently. It is important to note that due to capacitive coupling the total voltage on the strain sensor, $V_T$, is given by:

$$V_T = V_s + V_c$$

Where $V_c$ is the voltage due to small, but not negligible stray capacitances between the drive electrode and the sensor electrode designated as $C_s$ in FIGS. 23 and 24, as well as the capacitance between the drive electrode and the sensor lead wire. This voltage $V_c$ is cancelled by stepping down the voltage by using a voltage divider circuit 236 in FIG. 23 which feeds into an inverter as shown in FIG. 23 at 234. This standard circuit steps down the voltage by making $R_A$ much larger in magnitude than $R_B$. The output of the inverter is $-aV_{out}$, where a is a factor smaller than unity, for example 0.2, in the case when for example the input capacitance of the amplifier 225, designated $C_i$ in FIG. 24 is 10 pF, $C_s$ is 1.11 pF and $C_n$ is 10 pF. The output from the inverter is then fed to the sensor output through the neutralizing circuit capacitor $C_n$. Finally, at the condition $$a(C_n/(C_i+C_n)) = (C_s/(C_s+C_i))$$

the voltage induced by the stray capacitances, $V_c$, is cancelled. This condition results in the induced voltage, $V_n$, being equal in magnitude to that of the sum of the stray capacitances, $V_c$. When this condition is met, the total voltage is:

$$V_T = V_s + V_c - V_n = V_s$$

Having substantially eliminated the voltage due to stray capacitance in the strain sensor, the feedback of the voltage $V_s$, which is of opposite phase of the input voltage $V_{in}$, is effective in cancelling the self-vibration, or ringing.

The optimal short distance transducer with compensation for the ill-effects of ringing would be one which combines the opposite phase drive method circuit of FIG. 19 with the negative feedback used to reduce self-vibration as shown in FIG. 23. This combined circuit is shown in FIG. 24, where the drive signal is input from the circuit of the opposite phase drive method 245 is fed to an amplifier 241, and coupled with feedback from the strain sensor into the amplifier 235. This system is considered optimal since ringing in the transducer 244 is reduced by two physically different techniques.

Accordingly, there has been disclosed an improved ultrasonic proximity sensor utilizing piezoelectric film in the transducer assembly. While illustrative embodiments of the present invention have been disclosed herein, it is understood that various modifications and adaptations to the disclosed embodiments will be apparent to those of ordinary skill in the art and it is only intended that this invention be limited by the scope of the appended claims.

We claim:

1. A transducer assembly for a proximity sensor comprising:

an elongated polymer piezoelectric film;

a support member for supporting said film;

a first drive circuit connected to said film for applying a first varying electric field of a first phase and a first amplitude across the thickness of said film to cause an ultrasonic acoustic wave to be radiated from said film; and a second drive circuit connected to said film for applying a second varying electric field of a second phase and a second amplitude across the thickness of said film to cause an ultrasonic acoustic wave to be radiated from said film, whereby the selective application of said first and second varying electric fields reduces the effects of ringing.

2. A transducer assembly as recited in claim 1 wherein said first varying electric field is applied for a first predetermined time interval and said second varying electric field is applied for a second predetermined time interval, said second varying electric field being applied consecutive with said first varying electric field.

3. A transducer assembly as recited in claim 2 wherein said first and second varying electric fields are of substantially equal amplitude and substantially opposite phase.

4. A transducer assembly as recited in claim 2, wherein said first and second varying electric fields are of substantially equal amplitude and substantially opposite phase and said second predetermined time interval is smaller than said first predetermined time interval.

5. A transducer assembly as recited in claim 2, wherein said first and said second predetermined time intervals are substantially equal in duration, said first and said second varying electric fields are of substantially opposite phase, and said amplitude of said first varying electric field is larger in magnitude than said amplitude of said second varying electric field.

6. A transducer assembly for a proximity sensor comprising:

an elongated polymer piezoelectric film having a first section and a second section, said first section electrically isolated from said second section;

a support member for supporting said film;

a drive circuit connected to said film for applying a varying electric field across the thickness of said film to cause an ultrasonic acoustic wave to be radiated from said film; and a negative feedback circuit connected between said second section and said drive circuit, whereby the ill-effects of self-vibration in the piezoelectric film are substantially eliminated.

7. A transducer assembly as recited in claim 6, wherein said negative feedback circuit further comprises a voltage divider circuit connected to an inverter, said inverter connected to said second section by a capacitor, whereby stray capacitance in said piezoelectric film is effectively reduced.

8. A transducer assembly as recited in claim 6, wherein an inductive element is connected between said drive circuit and said transducer.

9. A transducer assembly for a proximity sensor comprising:

an elongated polymer piezoelectric film, having a first section and a second section, said second section being electrically isolated from said first section;

a support member for supporting said film;

a first drive circuit connected to said film for applying a first varying electric field of a first phase and a first amplitude across the thickness of said film to cause an ultrasonic acoustic wave to be radiated from said film;

a second drive circuit connected to said film for applying a second varying electric field of a second phase and a second amplitude across the thickness of said film to cause an ultrasonic acoustic wave to be radiated from said film, said first and second drive circuits having a common output; and a negative feedback circuit connected between said second section of said film and said common output of said first and second drive circuits, whereby the ill-effects of ringing in the piezoelectric film are substantially eliminated.

10. A transducer as recited in claim 9, wherein said common output of said first and second drive circuits and said negative feedback circuit are connected to said film via an amplifier.

* * * * *